(12) United States Patent
Geisler

(10) Patent No.: US 9,658,402 B2
(45) Date of Patent: May 23, 2017

(54) OPTICAL FIBER WINDING STRUCTURES AND TECHNIQUES

(71) Applicant: OFS Fitel, LLC, Norcross, GA (US)

(72) Inventor: Tommy Geisler, Brøndby (DK)

(73) Assignee: OFS FITEL, LLC, Norcross, GA (US)

( * ) Notice: Subject to any disclaimer, the term of this patent is extended or adjusted under 35 U.S.C. 154(b) by 861 days.

(21) Appl. No.: 13/968,542

(22) Filed: Aug. 16, 2013

(65) Prior Publication Data
US 2014/0050437 A1   Feb. 20, 2014

Related U.S. Application Data

(60) Provisional application No. 61/684,741, filed on Aug. 18, 2012.

(51) Int. Cl.
*G02B 6/27* (2006.01)
*G02B 6/10* (2006.01)

(52) U.S. Cl.
CPC ............. *G02B 6/274* (2013.01); *G02B 6/105* (2013.01); *G02B 6/278* (2013.01); *G02B 6/2793* (2013.01); *Y10T 29/49826* (2015.01)

(58) Field of Classification Search
CPC ........ G02B 6/105; G02B 6/274; G02B 6/278; G02B 6/2793; Y10T 26/49826
See application file for complete search history.

(56) References Cited

U.S. PATENT DOCUMENTS

| | | | |
|---|---|---|---|
| 6,707,558 B2* | 3/2004 | Bennett ................ | G01R 15/246 356/465 |
| 7,330,627 B2* | 2/2008 | Mullaney ............. | G02B 6/4439 385/134 |
| 8,768,133 B2* | 7/2014 | Bryon .................. | G02B 6/4447 385/135 |

* cited by examiner

*Primary Examiner* — Daniel Petkovsek
(74) *Attorney, Agent, or Firm* — Jacobs + Kim LLP

(57) ABSTRACT

A fiber is wound into first and second coils lying substantially in respective first and second planar directions having a substantially orthogonal relationship. The first and second coils are configured to result in respective first and second birefringences that are dominated by bend-induced birefringence. The first and second birefringences have respective axes that are rotated with respect to each other in real space by an angle that is substantially equal to 90 degrees. Light traveling through the fiber has a state of polarization that evolves in substantially opposite directions as it travels respectively through the first and second coils. The first and second coils are configured such that light traveling through the fiber acquires respective, substantially opposite first and second phase shifts. Light traveling through the fiber acquires respective first and second differential group delays that substantially compensate for each other.

9 Claims, 14 Drawing Sheets

OPTICAL FIBER WINDING STRUCTURES AND TECHNIQUES

CROSS REFERENCE TO RELATED APPLICATIONS

The present application claims the priority benefit of U.S. Provisional Patent Application Ser. No. 61/684,741, filed on Aug. 18, 2012, which is owned by the assignee of the present application, and which is incorporated herein by reference in its entirety.

BACKGROUND OF THE INVENTION

Field of the Invention

The present invention relates generally to optical fiber devices and methods, and in particular to improved optical fiber winding structures and techniques.

Background Art

There is an ever increasing need for fiber-based optical devices that are compact and use space as efficiently as possible. However, achieving small form factors for fiber-based devices has proven to be problematic. Fiber-based devices commonly include relatively long segments of optical fiber that are wound into coils. At the tighter coil diameters required for smaller form factors, differential group delay (DGD) and polarization mode dispersion (PMD) become increasingly significant.

Generally speaking, a bent fiber has an induced linear birefringence that is inversely proportional to the square of the bending diameter. Thus, in a tight fiber coil, which has a very small bending diameter, the total birefringence is dominated by bend-induced birefringence, irrespective of the fiber's intrinsic birefringence properties. A large bend-induced birefringence results in undesirable amounts of DGD and PMD.

There is thus a need for fiber winding techniques and structures that reduce or eliminate bend-induced birefringence and the resulting DGD and PMD.

LIST OF REFERENCES

R. Ulrich, S. C. Rashleigh and W. Eickhoff, "Bending Birefringence in Single-Mode Fibers," *Optics Letters*, Vol. 5, No. 6, pp. 273-275 (1980).

T. Geisler and P. Kristensen, "Impact of Systematic External Birefringence on PMD," *Optical Fiber Communication Conference and Exposition and the National Fiber Optic Engineers Conference*, Technical Digest (CD) (Optical Society of America, 2005), Paper JWA3 (2005).

C. D. Poole, J. H. Winters and J. A. Nagel, "Dynamical Equation for Polarization Dispersion," *Optics Letters*, Vol. 16, No. 6, pp. 372-374 (1991).

J. P. Gordon, and H. Kogelnik, "PMD Fundamentals: Polarization Mode Dispersion in Optical Fibers," *Proceedings of the National Academy of Sciences of the United States of America*, Vol. 97, No. 9, pp. 4541-457 (2000).

N. Shibata, M. Tsubokawa, M. Ohashi, K.-i. Kitayama, and S. Seikai, "Birefringence and Polarization Mode Dispersion in a Coil of a Single-Mode Fiber," *Journal of the Optics Society of America A*, Vol. 3, No. 11, pp. 1935-1940 (1986).

S. J. Garth, "Birefringence in Bent Single-Mode Fibers," *Journal of Lightwave Technology*, Vol. 6, pp. 445-449 (1988).

J. N. Ross, "The Rotation of the Polarization in Low Birefringence Monomode Optical Fibres Due to Geometric Effects," *Optical and Quantum Electronics*, Vol. 16, No. 5, pp. 455-461 (1984).

M. Martinelli, "A Universal Compensator for Polarization Changes Induced by Birefringence on a Retracing Beam," *Optics Communications*, Vol. 72, No. 6, pp. 341-344 (1989).

J. M. P. Delavaux, J. A. Nagel, K. Ogawa, D. DiGiovanni, "COBRA: Compensating Optical Balanced Double Pass Amplifier," *Technical Digest European Conference on Optical Communications, Firenze*, pp. 5-9 (1994).

A. Mecozzi and C. Antonelli, "Unified Treatment of Forward and Backward Propagating Polarized Lightwaves," *Journal of Lightwave Technology*, Vol. 29, No. 5, pp. 642-655 (2011).

SUMMARY OF THE INVENTION

These and other issues of the prior art are addressed by the presently described invention, aspects of which are directed to techniques and structures for winding an optical fiber in a configuration in which differential group delay is reduced or eliminated.

In a technique according to a practice of the invention, a fiber is wound into a three-dimensional, out-of-plane configuration that includes first and second coils lying substantially in respective first and second planar directions having a substantially orthogonal relationship. The first and second coils have respective bending radii that are configured to result in respective first and second birefringences that are dominated by bend-induced birefringence. The first and second birefringences have respective axes that are rotated with respect to each other in real space by an angle that is substantially equal to 90 degrees. Light traveling through the fiber has a state of polarization that evolves in substantially opposite directions as it travels respectively through the first and second coils. The first and second coils are further configured such that light traveling through the fiber acquires respective, substantially opposite first and second phase shifts. The result is that light traveling through the first and second coils acquires respective first and second differential group delays that substantially compensate for each other.

A further aspect of the invention is directed to an out-of-plane winding block, including first and second faces lying substantially in respective first and second planar directions that are substantially orthogonal to each other. Respective first and second winding hubs extend outwardly from the first and second faces and are configured to receive respective first and second coils of an optical fiber. The first and second hubs have respective radii that are configured such that when respective first and second fiber coils are wound thereon, each of the first and second coils has a respective bending radius that results in respective first and second birefringences that are dominated by bend-induced birefringence. The first and second birefringences have respective axes that are rotated with respect to each other in real space by an angle that is substantially equal to 90 degrees. Light traveling through the fiber has a state of polarization that evolves in substantially opposite directions as it travels respectively through the first and second coils. The first and second hubs are further configured to allow the first and second coils to be wound thereon such that light traveling through the fiber acquires respective, substantially opposite phase shifts. The result is that light traveling through the first and second coils acquires respective first and second differential group delays that substantially compensate for each other.

DETAILED DESCRIPTION

There are described herein structures and techniques for winding an optical fiber, in which the fiber is coiled in an "out-of-plane" configuration, whereby the resulting DGD is zero, or near zero, even though locally the fiber displays high birefringence.

Figure 1:
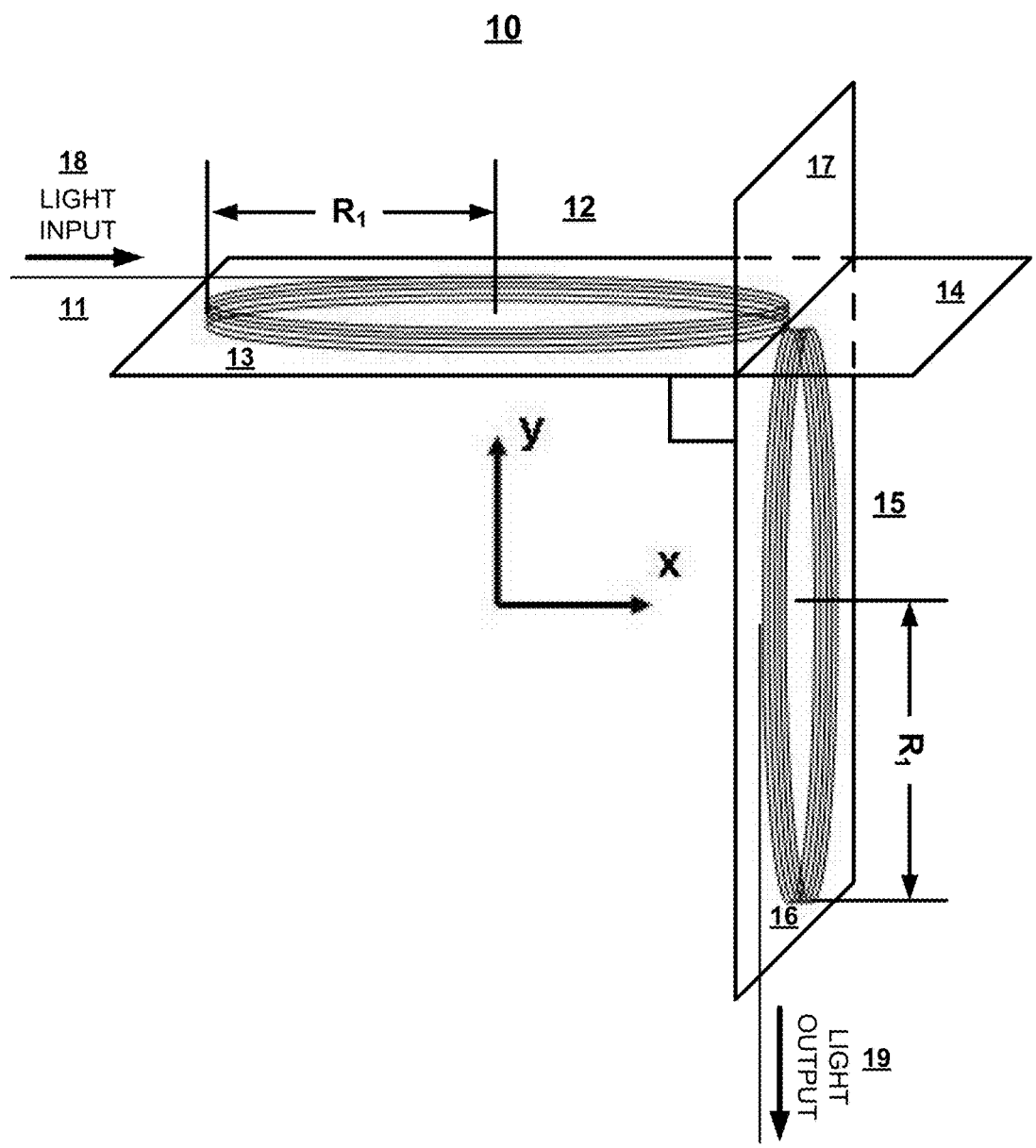
FIG. 1 shows a diagram of a three-dimensional out-of-plane winding configuration according to a practice of the invention.

FIG. 1 shows a diagram of a three-dimensional out-of-plane winding configuration 10 according to an exemplary practice of the invention. In winding configuration 10, an optical fiber 11 is wound around a y-axis into a first coil 12, comprising a first set of individual coil loops 13 disposed in a first planar direction 14, and having a bending radius of $R_1$. The fiber 11 is further wound around an x-axis into a second coil 15, comprising a second set of individual coil loops 16 disposed in a second planar direction 17, and having a second bending radius $R_2$. As illustrated in FIG. 1, the first planar direction 14 and the second planar direction 17 are orthogonal to each other. Fiber 11 is configured to receive a light input 18, which travels through the first coil 12 and the second coil 15, and is then provided as a light output 19.

As used herein, the term "coil" is refers to a set of loops of optical fiber lying in a given planar direction. In the FIG. 1 configuration 10, all of the individual loops of the first coil lie substantially in the same plane, as do all of the individual loops of the second coil. However, it would be possible to practice the present invention using a configuration in which individual loops of a given coil lie substantially in more than one plane. For example, in a practice of the invention illustrated in FIGS. 20-22, discussed below, fiber coils are wound onto the faces of a cube-shaped winding block. As used herein, the term "coil" includes a set of fiber loops that all lie substantially in the same planar direction, but that includes fiber loops wound onto opposite (i.e., parallel) faces of the winding block.

As described below, the first and second coils 12 and 15 have respective bending radii that are configured such that the first and second coils 12 and 15 display respective first and second birefringences that are dominated by respective first and second bend-induced birefringences. The first birefringence axis and the second birefringence axis are rotated with respect to each other in real space by 90 degrees.

Light traveling through the first coil has a state of polarization (SOP) that evolves in a direction opposite to that of light traveling in the second coil. Further, light traveling through the first coil and second coils acquires respective opposite first and second phase shifts.

Configured in this way, light traveling through the first and second coils acquires respective first and second differential group delays that compensate for each other. The net result is a substantial reduction, or elimination, of total differential group delay.

It should be noted that, for the purposes of the present discussion, the first and second planar directions are assumed to be perfectly orthogonal. It is further assumed that the individual coil turns in the first and second coils are all in perfect alignment with the first and second planar directions.

In a real-world implementation, of course, it is not possible to achieve perfect orthogonality or planar alignment. However, even where orthogonality or planar alignment is less than perfect, it is possible to achieve significant DGD reduction. Thus, as used herein, the words "substantial" and "substantially" are used to describe both ideal geometrical relationships, as well as geometrical relationships that are less than perfect, but that are sufficiently close to ideal to allow a given technique or structure to achieve a desired effect. Thus, for example, the phrase "substantially orthogonal relationship" shall be read to describe both a perfectly orthogonal relationship and a relationship that sufficiently close to perfectly orthogonal to result in the desired reduction in differential group delay.

As described below, there are a number of different aspects and practices of the invention. In one practice of the invention, the first coil and the second coil are identical in radius and number of windings. In further practices of the invention, the first and second coils are wound in the same circular direction (i.e., the coils are both wound in a clockwise direction or both wound in a counterclockwise direction) or opposite circular directions (i.e., one coil is wound in a clockwise direction and the other coil is wound in a counterclockwise direction). In a further practice of the invention, a first fiber is wound into a coil having a deterministic differential group delay, and is then paired with a second fiber having an opposite differential group delay in order to achieve and maintain a desired overall level of DGD.

It should further be noted that, for certain applications, it may be desirable to achieve and maintain a specified, non-zero level of DGD. It will be appreciated that the structures and techniques described herein may be suitably modified accordingly.

In the following discussion, an analytical framework is developed for analyzing birefringence, both intrinsic and externally induced, and its relationship to SOP evolution and DGD vector evolution. This analytical framework is then used to develop and evaluate a number of different winding configurations, including the out-of-plane winding configuration 10 illustrated in FIG. 1, discussed above.

The present discussion is organized into the following sections:
1. State of Polarization and DGD Vector Evolution
2. Bend-Induced Birefringence
3. Intrinsic Birefringence and Externally-Induced Birefringence
4. DGD for Different Coiling Configurations
4.1 Planar Figure-Eight Configuration
4.2 Twisted Planar Figure-Eight Configuration
4.3 Polarization Rotation Due to Geometric Effects
4.4 Continuous Twist in the Coils/Windings
4.5 Out-of-Plane Coiling
4.6 Other Configurations
4.7 Coil Followed by a PM fiber
4.8 Practical Implementation of Out-of-Plane Coiling
4.9 Experimental Confirmation of DGD for Different Coiling Configurations
5. General Technique 1. State of Polarization and DGD Vector Evolution In optical fibers exhibiting birefringence, polarization mode dispersion (PMD) and differential group delay (DGD) arise from a difference in the propagation characteristics of light waves with different polarization states. As used herein, the terms "polarization mode dispersion (PMD)" and "differential group delay (DGD)" are generally used interchangeably. In certain instances, the term "DGD" is used to refer to scalar magnitude, and the term "DGD vector" refer is used to refer to a vector representation of a given DGD.

The term "birefringence" refers to a physical phenomenon wherein an optical fiber exhibits a first refractive index along a first birefringent axis, and a second refractive index along a second birefringent axis. Which of the two refractive indices is "seen" by a given light traveling through the fiber depends upon the light's state of polarization. Light that travels through the lower of the two refractive indices will have a transmission speed that is faster than that of light that traveling through the higher of the two refractive indices. DGD arises from the difference between the two transmission speeds. The higher-speed birefringent axis is referred to as the "fast" axis, and the lower-speed birefringent axis is referred to as the "slow" axis.

Figure 2:
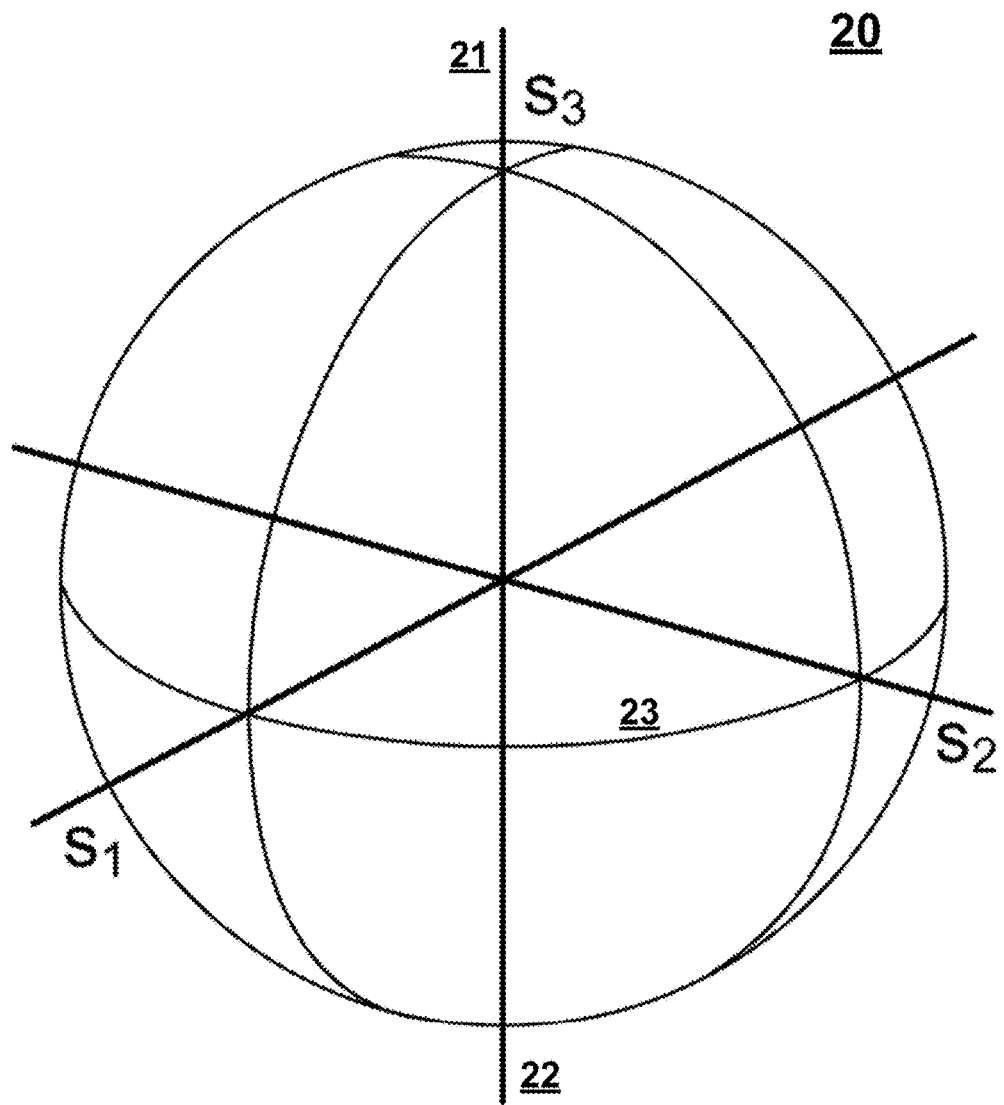
FIG. 2 shows a diagram of an exemplary Poincaré sphere according to the prior art.

FIG. 2 shows a diagram of an exemplary Poincaré sphere 20 according to the prior art. For the purposes of the present discussion, the evolution of states of polarization (SOPs) along a fiber is represented using the Poincaré sphere. As illustrated in FIG. 2, a Poincaré sphere 20 is a unit sphere centered at the origin in a three-dimensional rectangular coordinate system, in which the three axes are the three normalized Stokes parameters $s_1$, $s_2$, and $s_3$. Any state of polarization can be uniquely represented by a point on or within the sphere 20. The poles 21, 22 of the Poincaré sphere represent circular polarizations; points at the equator 23 represent linear polarizations; and points in between the poles and the equator represent different kinds of elliptically polarized light.

In the Poincaré sphere representation, the spatial evolution of the state of polarization (SOP) $\vec{s}$ along the axis of propagation is governed by the vector equation $$\frac{d\vec{s}}{dz} = \vec{\beta}(z,\omega) \times \vec{s} \tag{1.01}$$

where $\vec{\beta}(z)$ is the local birefringence vector that may change along the fiber length z. Integration yields the formal expression for the Müller rotation matrix R that relates the output SOP $\vec{s}_{out}$ to the input SOP $\vec{s}_{in}$, $$\vec{s}_{out} = R \cdot \vec{s}_{in} \tag{1.02}$$

The change in output SOP with change in frequency is governed by the vector equation $$\frac{d\vec{s}}{d\omega} = \vec{\tau}(z,\omega) \times \vec{s}. \tag{1.03}$$

where $\vec{\tau}$ is the PMD vector $$\vec{\tau} = \hat{p}\tau. \tag{1.04}$$

In equation 1.04, $\hat{p}$ is the principal state of polarization (PSP), and $\tau$ is the DGD.

From Equation 1.03, it will be seen that the output SOP vector $\vec{s}_{out}$ rotates on the Poincaré sphere as the frequency $\omega$ changes. The rotation axis is the PSP $\hat{p}$ and the rotation rate is the DGD $\tau$. From the two vector equations above the so-called "dynamical PMD equation" can be deduced:

$$\frac{d\vec{\tau}}{dz} = \frac{\partial \vec{\beta}(z,\omega)}{\partial \omega} + \vec{\beta}(z,\omega) \times \vec{\tau}. \quad (1.05)$$

Figure 3:
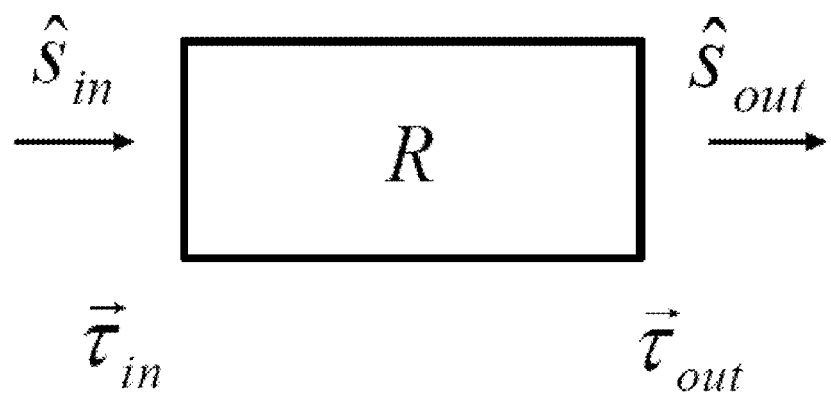
FIG. 3 is an illustrative diagram of a scheme for analyzing DGD in an optical fiber, in which a section of the fiber is represented as a 3×3 rotation matrix R that generates output Stokes vectors $\hat{s}_{out}$ from input Stokes vectors $\hat{s}_{in}$.

FIG. 3 is an illustrative diagram of a scheme 30 in which a fiber section represented by a 3×3 rotation matrix R, relates the output Stokes vectors $\hat{s}_{out}$ to the input Stokes vectors $\hat{s}_{in}$, as follows:

$$\hat{s}_{out} = R\hat{s}_{in}. \quad (1.06)$$

The corresponding output PMD vectors $\vec{\tau}_{out}$ and input PMD vectors $\vec{\tau}_{in}$ are related as follows:

$$\vec{\tau}_{out} = R\vec{\tau}_{in}. \quad (1.07)$$

Figure 4:
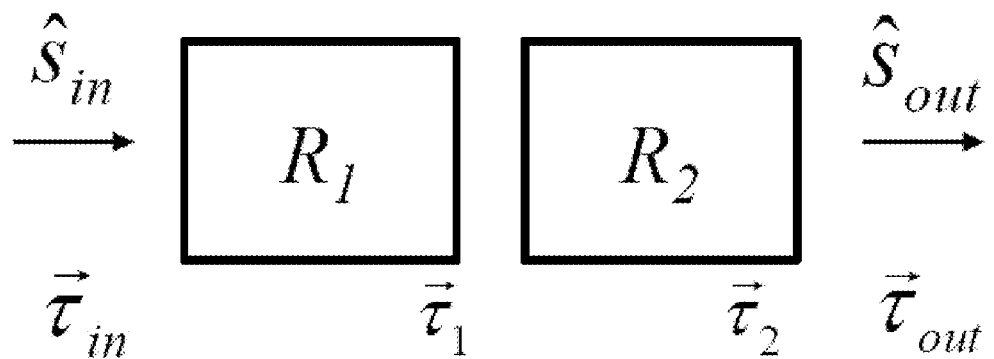
FIG. 4 is an illustrative diagram of a scheme for analyzing DGD in an optical fiber, in which two concatenated sections of the fiber are represented by a pair of respective rotation matrices.

FIG. 4 is an illustrative diagram of a scheme 40 in which two concatenated fiber sections are represented by rotation matrices, $R_1$ and $R_2$. The rotation matrix of the concatenation is $$R = R_1 R_2. \quad (1.08)$$

Recalling that R is orthogonal ($R^t = R^{-1}$), i.e., $RR^T = I$, the identity matrix, the PMD vector of the concatenation is:

$$\begin{aligned}\vec{\tau}_{out} \times &= R_\omega R^T \\ &= R_{2\omega} R_1 R_1^T R_2^T + R_2 R_{1\omega} R_1^T R_2^T \\ &= \vec{\tau}_2 \times + R_2 (\vec{\tau}_1 \times) R_2^T \\ &= \vec{\tau}_2 \times + (R_2 \vec{\tau}_1) \times \end{aligned} \quad (1.09)$$

which results in the following concatenation rule:

$$\vec{\tau}_{out} = \vec{\tau}_2 + R_2 \vec{\tau}_1 \quad (1.10)$$

Figure 5:
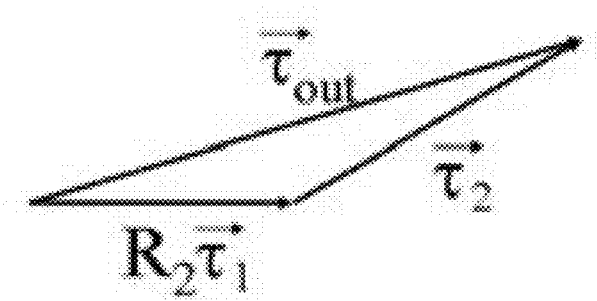
FIG. 5 shows a diagram showing a vector representation of the DGD output resulting from the concatenation of two fiber sections, each of which introduces a respective amount of DGD into a light traveling therethrough.

FIG. 5 shows a vector diagram 7 illustrating the relationship set forth in Equation 1.10.

In general, the concatenation of n sections can be expressed as follows:

$$\vec{\tau}_{out} = \sum_{n=1}^{m} R(m, n+1) \vec{\tau}_n, \quad (1.11)$$

where $$R(m,n) = R_m R_{m-1} \ldots R_n. \quad (1.12)$$

For three sections, the following relationship obtains:

$$\vec{\tau}_{out} = \vec{\tau}_3 + R_3 \vec{\tau}_2 + R_3 R_2 \vec{\tau}_1 \quad (1.13)$$

If now the two section concatenation is reconsidered at the input $$\begin{aligned}\vec{\tau}_{in} \times &= R^T (\vec{\tau}_{out} \times) R \\ &= R^T R_\omega \\ &= R_1^T R_2^T R_{2\omega} R_1 + R_1^T R_2^T R_2 R_{1\omega}\end{aligned} \quad (1.14)$$

If it is assumed that the following very special requirement $R_2 = R_1^T$ is fulfilled, and we recall that $R_1 R_1^T = I$, we then have $$\begin{aligned}\vec{\tau}_{in} \times &= R_1^T R_1 R_{2\omega} R_2^T + R_1^T R_1 R_1^T R_{1\omega} I \\ &= I R_{2\omega} R_2^T + I R_1^T R_{1\omega} R_1^T R_1 \\ &= \vec{\tau}_2 \times + R_2 (\vec{\tau}_1 \times) R_2^T \\ &= \vec{\tau}_2 \times + (R_2 \vec{\tau}_1)\end{aligned} \quad (1.15)$$

or $$\vec{\tau}_{in} = \vec{\tau}_2 + R_2 \vec{\tau}_1 = \vec{\tau}_{out} \quad (1.16)$$

This result shows that if $R_2 = R_1^T$, then the PMD vector is unchanged after the two sections, i.e. the increase in PMD is zero. This also applies for the Stokes vector SOP.

2. Bend-Induced Birefringence

The fiber in a coiling configuration will result in bend-induced birefringence and thus DGD. The DGD $\Delta\tau$ is given as, $$\Delta\tau = \frac{B_{group}}{c}, \quad (2.01)$$

where $B_{group}$ is the group birefringence and c is the speed of light. The birefringence is related to the differential group delay, as $$B_{group} = \frac{\lambda}{2\pi} \Delta\beta_{group} \quad (2.02)$$

or $$\Delta\tau = \frac{B_{group}}{c} = \frac{\lambda}{2\pi c} \Delta\beta_{group} = \frac{\Delta\beta_{group}}{\omega} \quad (2.03)$$

If only stress induced birefringence is considered, the analysis may be simplified by assuming that the group delay and the phase delay are equal, i.e.:

$$\beta_{group} \approx \beta_{phase} \quad (2.04)$$

whereby $$\Delta\tau = \frac{\Delta\beta_{group}}{\omega} \approx \frac{\Delta\beta_{phase}}{\omega} = \frac{\Delta n}{c} \quad (2.05)$$

For a fiber with radius r bent uniformly with a bend radius of R the stress/strain effects will induce a birefringence and thus DGD, as follows:

$$\Delta n = -0.137 \left(\frac{r}{R}\right)^2 \quad (2.06)$$

or $$\Delta\tau = \frac{0.137}{c} \left(\frac{r}{R}\right)^2 \quad (2.07)$$

The slow axis is normal to the plane of curvature. On the Poincaré sphere, the bend-induced birefringence is thus stationary pointing in the same direction, in the laboratory reference frame. The intrinsic birefringence may point in any direction. At a wavelength of 1550 nm the beat length is $$L_B = \frac{\lambda}{\Delta n} \approx 2900 \cdot R^2 \qquad (2.08)$$

for a fiber radius of 62.5 μm.

Figure 6:
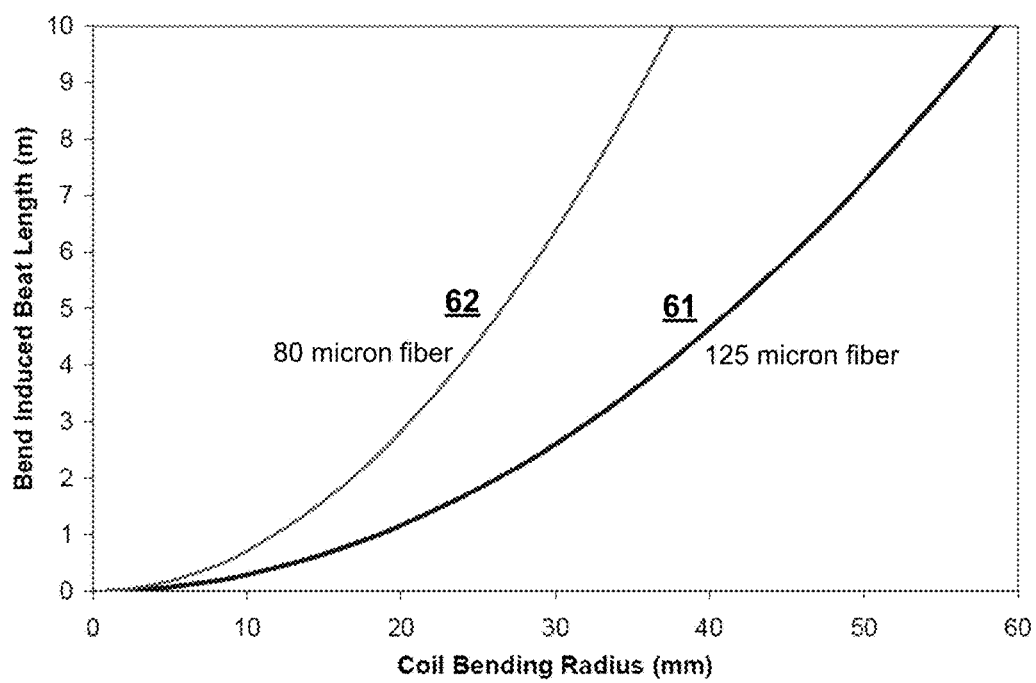
FIG. 6 shows a graph illustrating beat length due to the bend-induced birefringence as a function of bending radius.

FIG. 6 shows a graph 8 illustrating beat length due to the bend-induced birefringence as a function of bending radius, for fibers with radius 62.5 μm (trace 41) and 40 μm (trace 42). As shown by trace 61, if a bend having a radius of 1 meter is introduced into a 62.5 μm fiber, a beat length of 29 cm results. The bend-induced beat length may be much shorter than the intrinsic fiber beat length. Depending upon fiber and fiber type, the intrinsic fiber beat length typically has a range from 1 meter up to several 10's of meters.

The bend-induced birefringence has been shown to hold for bending diameters down to 4 mm for a 125 μm diameter fiber. The geometrical birefringence due to the bending is several orders of magnitude less than the bend-induced birefringence due to stress, and behaves as follows:

$$B_{geometric} \sim \frac{2\pi}{\lambda} n_0 \left(\frac{\rho}{D}\right)^2, \qquad (2.09)$$

where ρ is the fiber core diameter. The ratio between the geometric and the stress birefringence is for practical purposes ~$10^{-3}$. The strength of bend-induced birefringence has been shown to hold for various types of fibers, including, for example: standard single-mode fiber (SSMF), non-zero dispersion fiber (NZDF), and dispersion-compensating fiber (DCF), where the last has a core with a very high index.

3. Intrinsic and Externally Induced Birefringence

In general the birefringence vector is the sum of intrinsic fiber birefringence $\vec{\beta}_I$ and externally induced birefringence $\vec{\beta}_E$. The latter may have several contributions, including linear contributions (e.g., bending, tension) and circular contributions (twist). The overall impact of a fiber's intrinsic birefringence may be reduced by spinning the fiber as it is drawn from a preform. In the extreme case, the fiber will respond to externally induced birefringence as if it had virtually zero intrinsic birefringence.

Three cases are considered with respect to a modeled unspun fiber:

3.1 An unspun fiber where intrinsic birefringence dominates;
3.2 The unspun fiber where externally-induced birefringence dominates; and
3.3 The unspun fiber where the intrinsic birefringence and the externally induced birefringence have equal magnitudes.

For the purposes of the present analysis, the evolution of the state of polarization (SOP) and the DGD vector were simulated numerically by the wave-plate model.

3.1 Intrinsic Birefringence Dominates

Figure 7:
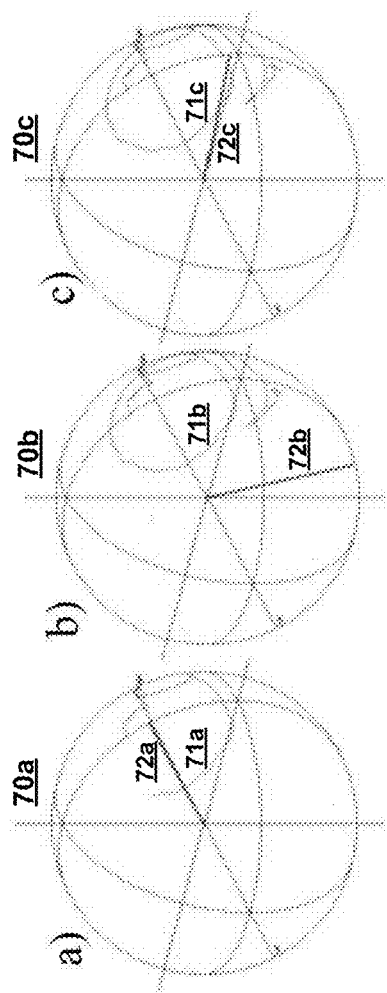
FIG. 7 shows a series of Poincaré spheres illustrating the SOP evolution for an exemplary unspun fiber with a dominant intrinsic birefringence.

FIG. 7 shows a series of Poincaré spheres 70a, 70b, and 70c, displaying the SOP traces 71a, 71b, and 71c, respectively, for an unspun fiber with a dominant intrinsic birefringence corresponding to a beat length $L_{B,I}$ of 10 meters.

In Poincaré sphere 70a, trace 71a shows the SOP evolution at a propagation distance of 5 meters; in Poincaré sphere 70b, trace 71b shows the SOP evolution just before 10 meters; and in Poincaré sphere 70c, trace 71c shows the SOP evolution at 10 meters. In Poincaré spheres 70a, 70b, and 70c, radial line segments 72a, 72b, and 72c show the respective direction of the instantaneous (linear) random birefringence at the three selected propagation distances.

The birefringence is modeled according to the random modulus model (RRM) with correlation length h=1 meter. The external induced birefringence was set to almost zero, corresponding to a beat length, $L_{B,E}$, of 1 kilometer. A very erratic SOP evolution is observed due to the randomness in the intrinsic birefringence.

Figure 8:
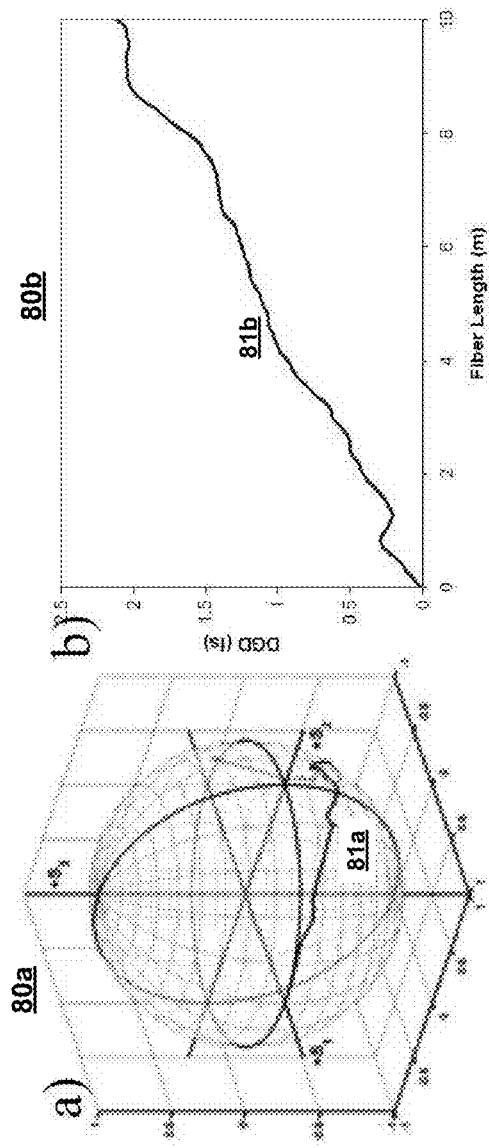
FIG. 8 shows a Poincaré sphere and graph that together illustrate the DGD vector evolution in the unspun fiber of FIG. 7.

FIG. 8 shows a Poincaré sphere 80a and graph 80b that together illustrate the DGD vector evolution in the fiber of FIG. 7. In Poincaré sphere 80a, trace 81a shows the evolution of the principal state of polarization (PSP), which provides the direction of the DGD vector. In graph 80b, trace 81b provides the magnitude of the DGD vector. Similar to the SOP evolution illustrated in FIG. 7, a very erratic evolution in the DGD vector is observed in FIG. 8 due to the randomness in the intrinsic birefringence.

3.2 Externally-Induced Birefringence Dominates

If the externally induced birefringence dominates, and if the externally induced birefringence is, by the nature of the way it is induced (see below), uniform along the length of the fiber, the picture changes.

Figure 9:
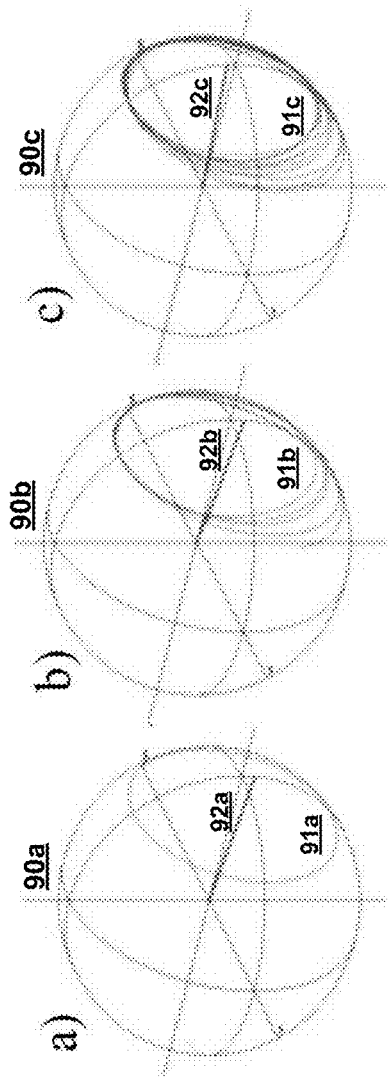
FIG. 9 shows a series of Poincaré spheres illustrating SOP evolution traces for an exemplary unspun fiber with a dominant externally-induced birefringence.

FIG. 9 shows a series of Poincaré spheres 90a, 90b, and 90c illustrating SOP evolution traces 91a, 91b, and 91c for the unspun fiber of FIG. 7, but where the external induced birefringence has been set to a factor of 10 larger than the intrinsic birefringence, corresponding to a beat length $L_{B,E}$ of 1 meter. The SOP now evolves in circles as for a polarization-maintaining (PM) fiber. The randomness in the intrinsic birefringence just adds small noise to the circles.

Traces 90a, 90b, and 90c show the SOP evolution, respectively, at propagation distances of 1 meter, 5 meters, and 10 meters. Radial line segments 92a, 92b, and 92c show the direction of the instantaneous (linear) almost uniform birefringence at the three selected propagation distances.

Figure 10:
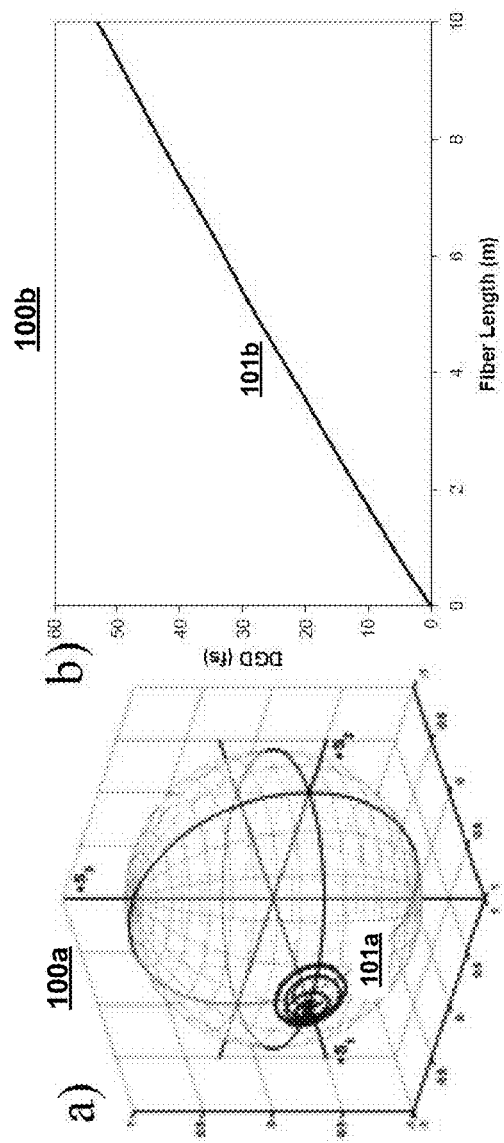
FIG. 10 shows a Poincaré sphere and graph that together illustrate the DGD vector evolution in the unspun fiber of FIG. 9.

FIG. 10 shows a Poincaré sphere 100a and graph 100b that together illustrate the DGD vector evolution in the unspun fiber of FIG. 9. In Poincaré sphere 100a, trace 101a shows the evolution of the principal state of polarization (PSP), which provides the direction of the DGD vector. In graph 100b, trace 101b provides the magnitude of the DGD vector. In this case all the DGD vectors nearly point in the same direction and a linear increase with length is observed.

3.3 Intrinsic and Externally Induced Birefringence are Equal

If the intrinsic and the external induced birefringence are of equal or similar magnitude, the randomness of the intrinsic birefringence will dominate.

Figure 11:
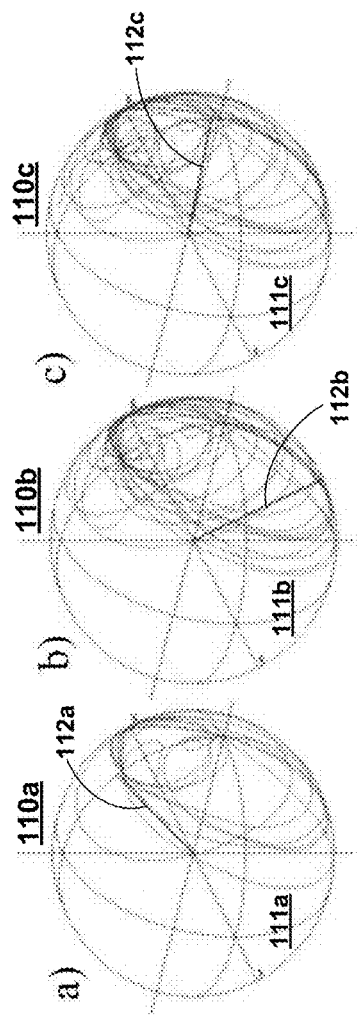
FIG. 11 shows a series of Poincaré spheres illustrating SOP evolution traces for an exemplary unspun fiber in which neither intrinsic birefringence nor externally-induced birefringence is dominant.

FIG. 11 shows a series of Poincaré spheres 110a, 110b, and 110c illustrating SOP evolution traces 111a, 111b, and 111c for the unspun fiber of FIG. 7, in which the externally-induced birefringence and intrinsic birefringence are set to equal magnitude, corresponding to a beat length $L_{B,E}=L_B$, $r=1$ meter. Traces 111a, 111b, and 111c show the SOP evolution traces, respectively, at propagation distances of 5 meters, just before 10 meters, and 10 meters. Radial line segments 112a, 112b, and 112c show the direction of the instantaneous (linear) almost uniform birefringence at the three selected propagation distances.

Figure 12:
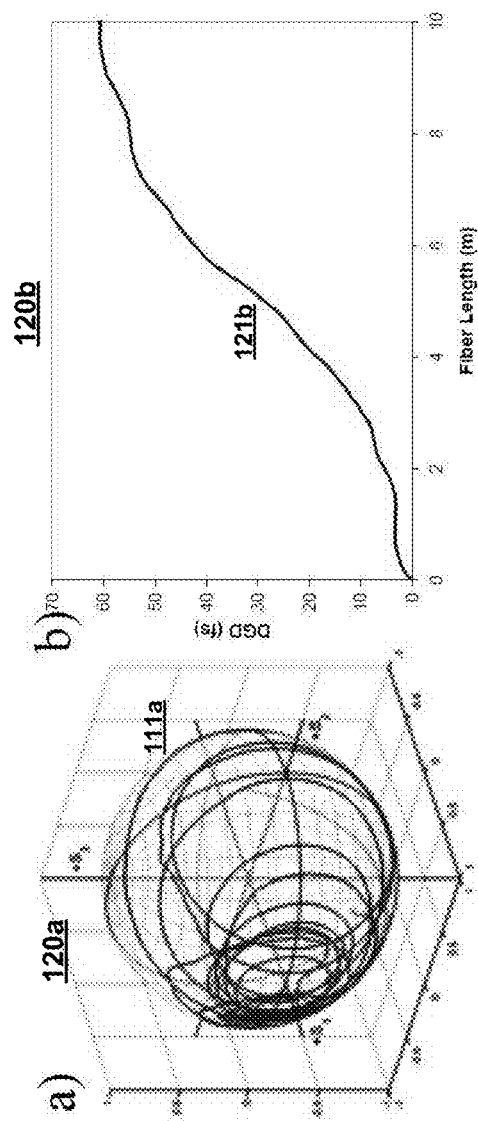
FIG. 12 shows a Poincaré sphere and graph that together illustrate the DGD vector evolution in the unspun fiber of FIG. 11.

FIG. 12 shows a Poincaré sphere 120a and graph 120b that together illustrate the DGD vector evolution in the unspun fiber of FIG. 11. In Poincaré sphere 120a, trace 121a shows the evolution of the principal state of polarization (PSP), which provides the direction of the DGD vector. In graph 120b, trace 121b, trace 126 provides the magnitude of the DGD vector.

As shown in FIGS. 11A-11C and 12A-12B, the SOP evolution and the evolution of the DGD vector are once again very erratic, as the SOP evolution is dominated by the randomness in the intrinsic birefringence.

4. The DGD for Different Coiling Configurations

In the following section, different coiling configurations are discussed and evaluated with respect to the possibility of mitigating DGD. There are first presented a number of planar configurations that are not suitable for DGD mitigation. There is then presented an out-of-plane configuration that is capable of mitigating the DGD to zero, or near zero.

4.1 Planar Figure-Eight Configuration

Figure 13:
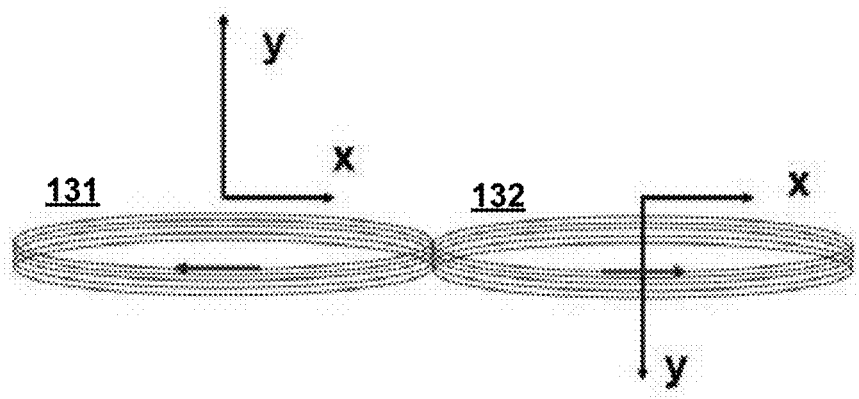
FIG. 13 shows a diagram of a planar figure-eight coil configuration.

FIG. 13 shows a diagram of one possible solution, a figure-eight configuration 130, wherein an optical fiber 131 is wound into first and second coils 132 and 133 that are rotated 180 degrees with respect to each to form the figure-eight.

Figure 14:
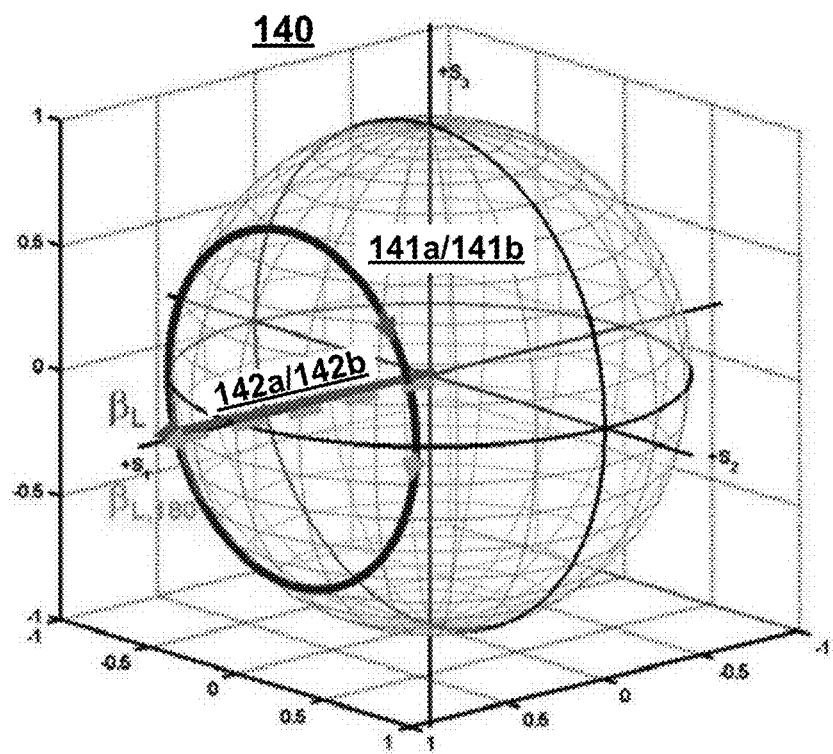
FIG. 14 shows a Poincaré sphere representation of the birefringence properties of the figure-eight configuration shown in FIG. 13.

FIG. 14 shows a Poincaré sphere representation 140 of the birefringence properties of the figure-eight configuration 130, in which circles 141a and 141b represent, respectively, the SOP evolutions of the first and second coils, and in which vectors 142a and 142b represent, respectively, the birefringence vectors of the first and second coils. It will be seen that circles 141a and 141b are substantially identical, as are vectors 142a and 142b.

As illustrated by FIG. 14, even though the "slow" and "fast" birefringence axes are rotated by 180 degrees in real space, this rotation corresponds to a 360-degree rotation on the Poincaré sphere, i.e., the birefringence vectors $\beta_L$ and $\beta_{L,180}$ point in the same direction on the Poincaré sphere. In other words, the birefringence properties of a fiber coil that is rotated by 180 degrees in real space are similar to the properties of a fiber coil with zero rotation. Thus, in the figure-eight configuration 130, the DGD of the first loop 132 is additive with the DGD of the second loops 133.

It should be noted that FIGS. 13 and 14 show a theoretical illustration of an ideal case, in which the SOP evolution is assumed to be totally dominated by a uniform bending-induced birefringence. In the ideal case, the DGD of two coils arranged in a planar figure-eight configuration will be the same as the DGD of a single fiber coil with an equivalent fiber length, number of loops, and bending radius.

4.2 Twisted Planar Figure-Eight Configuration

Figure 15:
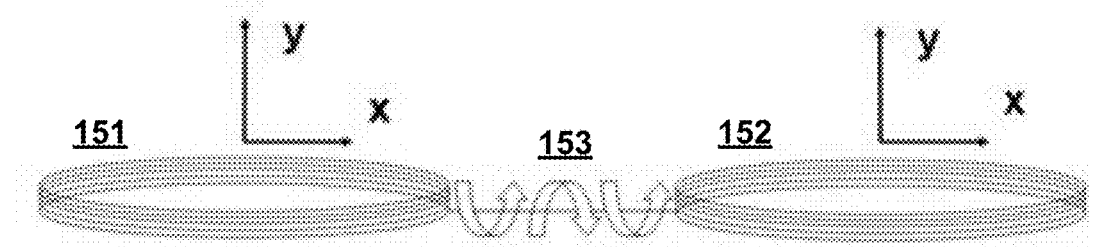
FIG. 15 shows a diagram of modified planar figure-eight configuration, in which a twist is introduced between the two coils.

FIG. 15 shows a diagram of a modified planar figure-eight configuration 150. In the configuration 150, an optical fiber is wound into a first coil 151 and a second coil 152, both lying in the same plane, wherein the second coil 152 is rotated 180 degrees in real space relative to the first coil 151. Configuration 150 further includes a twist 153 between the first and second coils 151 and 152. The purpose of the twist 153 is to introduce a circular birefringence into the fiber in order to rotate the SOP by 90 degrees in real space, with the objective of causing the DGD of the second coil 152 to compensate for the DGD of the first coil 151.

Figure 16:
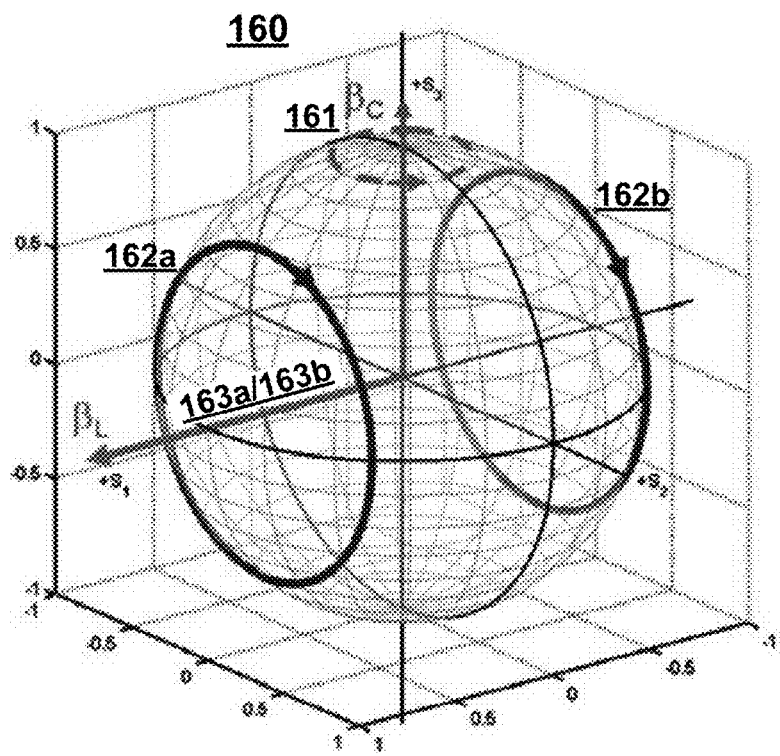
FIG. 16 shows a Poincaré sphere representation of the birefringence properties of the modified planar figure-eight configuration shown in FIG. 15.

FIG. 16 shows a Poincaré sphere representation 160 of the birefringence properties of configuration 150, in which it is assumed that twist 153 has been suitably configured to cause the desired 90-degree rotation of the SOP in real space. Poincaré sphere 160 illustrates the twist birefringence vector $\beta_C$ and SOP evolution 161, the first coil SOP evolution 162a, the second coil SOP evolution 162b, and the respective birefringence vectors $\beta_L$ of the first and second coils.

As shown in FIG. 16 the 90-degree rotation of the SOP in real space corresponds to a 180-degree rotation on the Poincaré sphere. However, the respective birefringence vectors $\beta_L$ of the first and second coils still both point in the same direction (in the laboratory-frame). Thus, in configuration 150, the DGD of the two coils 151 and 152 will generally not compensate for each other. However, it should be noted that some unquantifiable suppression of DGD will occur.

4.3 Polarization Rotation Due to Geometric Effects

If a fiber is bent into a non-planar curve, such as a helix or the like, the polarization state is rotated due to geometric effects. This polarization rotation occurs even in the absence of any natural fiber birefringence or stress-induced effects. Thus, if two coils in the same plane are connected by a helical wound fiber, it is possible to rotate the SOP by 90 degrees between the coils. This is analogous to the previous case of SOP rotation by twisting shown in FIG. 15, replacing the twisted fiber by a suitable helical wound fiber.

Again the 90-degree rotation of the SOP in real space corresponds to a 180-degree rotation on the Poincaré sphere. As the two coils are in the same plane, the birefringence vector of the second coil, however, still points in the same direction on the Poincaré sphere (in the laboratory frame) as that of the first coil and the DGD of the two coils will generally not compensate each other. Again however, the change in SOP will result in some unquantifiable reduction of the overall DGD.

In the following sections, there are considered configurations in which the direction of the birefringence vector rather than the SOP is altered.

4.4 Continuous Twist in the Coils/Windings

By continuously twisting the fiber while it is wound into a coil, it is possible to suppress the bend-induced DGD. If it is assumed that the bend-induced birefringence is far greater than the internal linear birefringence, i.e., $\vec{\beta}_E \gg \vec{\beta}_I \approx 0$ or $\vec{\beta}_L \cong \vec{\beta}_E$, the DGD equation for the system can be solved. However, it turns out that the minimum DGD that can be obtained is 60% of the value without any twist applied.

The DGD, in units of seconds/meter can be shown to be given as:

$$DGD = \frac{\frac{\lambda}{2\pi c}\left(\frac{0.74}{\lambda^2}\left(\frac{d}{D}\right)^4 + 0.077\tau_{twist}^2\right)}{\sqrt{\frac{0.74}{\lambda^2}\left(\frac{d}{D}\right)^4 + 0.077\tau_{twist}^2}} \quad (4.01)$$

where $\tau_{twist}$ is the twist-rate in turns/m, i.e. $\tau_{twist}=\tau/(2\pi)$. DGD just due to bending (no twist) is $$\frac{\beta_b}{\omega} = \frac{0.137}{\omega}\left(\frac{d}{D}\right)^2. \quad (4.02)$$

Figure 17:
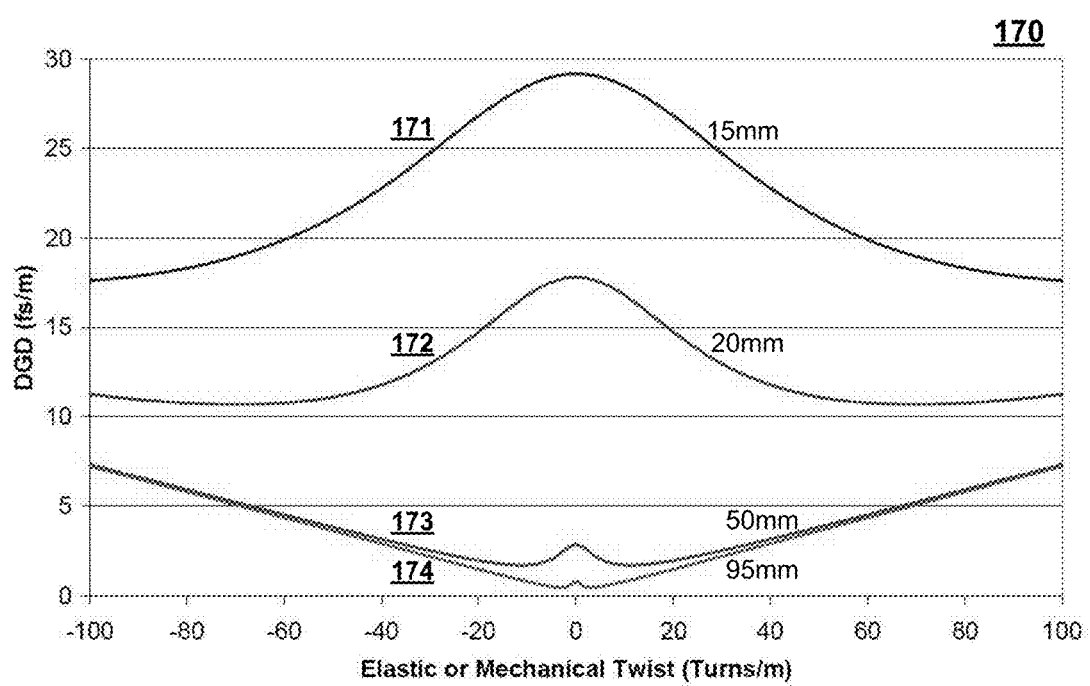
FIG. 17 is a graph showing the resulting DGD for various coiling diameters as a function of a mechanically applied twist.

FIG. 17 is a graph 170 showing the resulting DGD for various coiling diameters as a function of mechanically applied twist for fiber diameters of 80 μm (trace 171) and 125 μm (traces 172, 173, and 174). It is seen that for a bending diameter of 20 mm of a 125 μm fiber (trace 172), a twist rate of approximately 70 turns per meter is required to achieve the minimum DGD. For an 80 μm fiber with a bending diameter of 15 mm a twist rate of just over 100 turns per meter is required to achieve the minimum DGD. These are unrealistically high twist rates for a real fiber, which is likely to break. However, if the bending diameter is somewhat greater, e.g., 50 mm or more, then the twist rates required to minimize DGD will be on the order of 10 twists per meter or lower.

4.5 Out-of-Plane Coiling

The FIG. 1 out-of-plane winding configuration 10 is now discussed in greater detail.

As discussed above, FIG. 1 shows a three-dimensional out-of-plane winding configuration 10, in which an optical fiber 11 is wound into first and second coils lying in respective first and second planar directions that are orthogonal, or substantially orthogonal, to each other.

Figure 18:
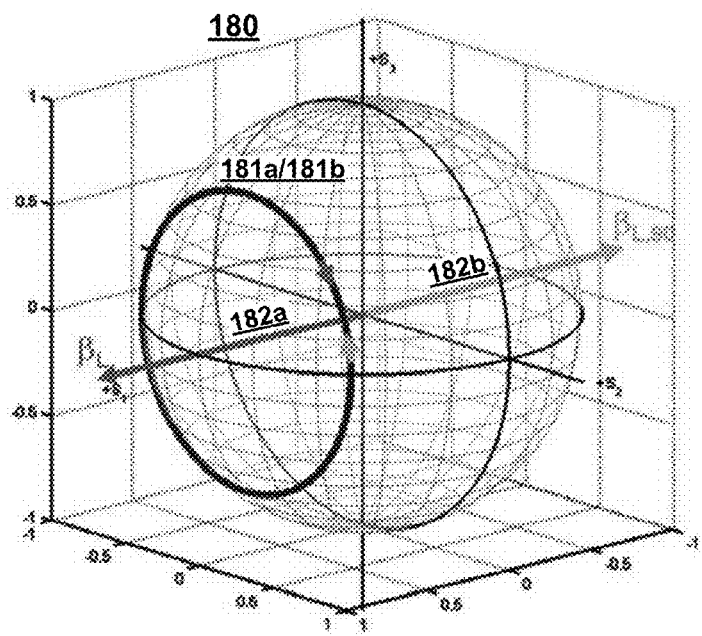
FIG. 18 shows a Poincaré sphere representation of the birefringence properties of the out-of-plane winding configuration shown in FIG. 1.

FIG. 18 shows a Poincaré sphere representation 180 of the birefringence properties of the out-of-plane winding configuration 10 shown in FIG. 1. In configuration 10, it is implied that the slow axis and the fast axis are rotated 90 degrees in real space, corresponding to a 180-degree rotation of the birefringence vector in the Poincaré sphere 180.

Poincaré sphere 180 illustrates the SOP evolution for the first and second coils (circles 181a and 181b) as well as their respective birefringence vectors 182a and 182b. As shown in FIG. 18, the SOP evolution for the first and second coils follows the same path but now evolve in opposite directions, clockwise (CW) and counterclockwise (CCW).

In the ideal situation, the Müller rotation matrices $R_1$ and $R_2$ of two identical windings are related as $R_2 = R_z(\phi) R_1$ with:

$$R_z(\phi) = \begin{pmatrix} \cos\phi & -\sin\phi & 0 \\ \sin\phi & \cos\phi & 0 \\ 0 & 0 & 1 \end{pmatrix} \overset{\phi=180}{=} \begin{pmatrix} -1 & 0 & 0 \\ 0 & -1 & 0 \\ 0 & 0 & 1 \end{pmatrix} \quad (4.03)$$

where $\phi/2$ is the angular rotation around the z-axis in real space, which in this case is 90 degrees, equivalent to a 90-degree rotation around the x-axis followed by a 90-degree rotation around the y-axis.

It should be noted that the $R_z(180°)$ is equivalent to the Mueller rotation matrix for a Faraday Rotation Mirror (FRM). As shown in the art, this (proper) rotation by 180 degrees around the $s_3$ axis in Stokes space transforms the Stokes and birefringence vectors as follows:

$$\vec{s}' = (-s_1, -s_2, s_3) \quad (4.04)$$

and $$\vec{\beta}' = (-\beta_1, -\beta_2, -\beta_3) = -\vec{\beta} \quad (4.05)$$

It will be seen that the birefringence vector has changed sign. Accordingly, the polarization will undertake an inverse evolution in the second winding, compared with the polarization of the first winding. Thus, the DGD of one winding will compensate for the DGD of the other winding if the windings are identical. This is similar to the SOP evolution in a Faraday Rotation Mirror (FRM), which adds only the circular birefringence of the round-trip birefringence.

However using the out-of-plane configuration, even the circular birefringence can be compensated for, assuming that the circular birefringence results from elastic twisting of the fiber. In that case, compensation for circular birefringence can be achieved by winding one of the coils with a clockwise twist and winding the other coil with a complementary counterclockwise twist.

Figure 19:
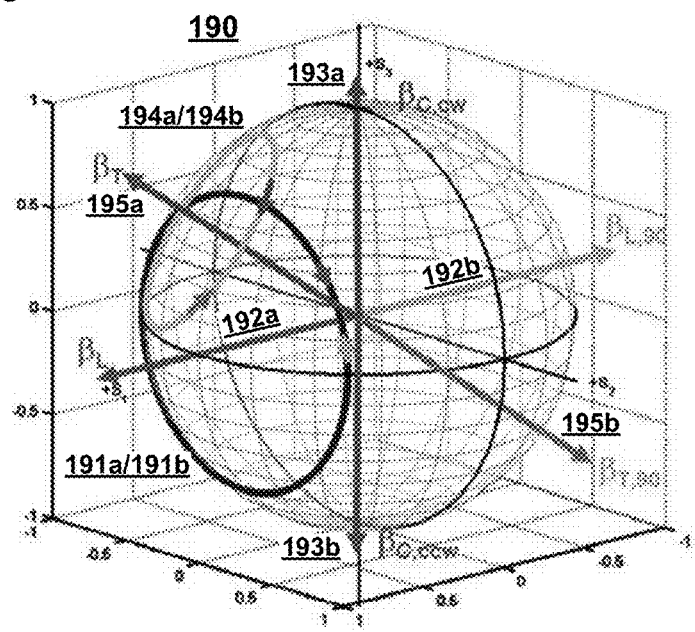
FIG. 19 shows a Poincaré sphere illustrating the SOP evolution in a modified out-of-plane coil configuration in which the first and second coils are wound to include respective clockwise and counterclockwise twists.

FIG. 19 shows a Poincaré sphere 190 that illustrates the ideal case of an out-of-plane coil configuration, including circular birefringence due to clockwise and counterclockwise twisting of the fiber in the windings. Poincaré sphere 190 illustrates the SOP evolution for the first and second untwisted coils (circles 191a and 191b) as well as their respective birefringence vectors 192a and 192b. Poincaré sphere 190 further illustrates the respective birefringence vectors 193a and 193b for the clockwise and counterclockwise twists, the SOP evolution for each of the twisted coils (circles 194a and 194b), and their respective birefringence vectors 195a and 195b.

Some small amounts of twisting can be tolerated, if the twist-induced circular birefringence is small compared with bend-induced linear birefringence. In that case, the twisting of the fiber will not affect the SOP evolution significantly.

4.6 Other Configurations

It should be noted that in the general case the coiling configuration doesn't have to be such that each coil contains the same fiber length, the important parameter is the acquired phase-shift (change in SOP) before and after the 90-degree rotation of the birefringence axis in real space. The acquired phase shift should be the same.

The acquired phase-shift is given by the following equation:

$$\Delta\phi = \int_z \frac{2\pi}{\lambda} \Delta n(z) dz = \int_z \Delta\beta(z) dz \quad (4.06)$$

As an example, two coils with different diameters, $D_1$ and $D_2$, should contain the fiber lengths such that $(L_1/L_2)^{1/2} = D_1/D_2$. This will ensure the same acquired phase shift, assuming that the birefringence is due to bending only. In a circular coil the length of each winding is equal to $\pi \cdot D$, so the DGD or the acquired phase shift of one winding in circular coil is proportional with $D^{-1}$. For example, if the diameters of the two windings have the relationship $D_1 = 2D_2$, then two windings with diameter $D_1$ are required to compensate one winding with diameter $D_2$.

From the above discussion, it will be appreciated that the invention may be practiced with more than two coils, so long as the total SOP evolution in one direction matches the total SOP evolution in the opposite direction.

It is also evident that the coiling configuration doesn't have to be a circular coiling; e.g., elliptical and other configurations could be envisaged. The only requirements are that the induced birefringence is much larger than the intrinsic birefringence and that the acquired phase-shift is the same (in absolute sense) before and after the birefringence axis is rotated 90 degrees. That is, $$\oint_1 \Delta\beta_1(z) dz = -\oint_2 \Delta\beta_2(z) dz. \quad (4.07)$$

Another important aspect is that the SOP evolution is more or less deterministic. This is fulfilled if the length of the fiber in each coil is significantly less than the correlation length $L_C$ of the SOP: i.e., mode coupling is essential zero and the fiber coil acts as a PM fiber, which requires that the intrinsic random birefringence is small compared to the non-random extrinsic (induced) birefringence. This requirement is easily fulfilled in very tight coils even for finite levels of intrinsic fiber birefringence. Thus the more induced birefringence the more relaxed one can be with respect to the intrinsic fiber birefringence properties. If the fiber furthermore is spun the intrinsic properties are even more relaxed.

4.7 Coil Followed by a PM Fiber

If the birefringence of a tight coil can be considered deterministic, i.e., then it is behaving like a polarization-maintaining (PM) fiber. Then the DGD of the coil can be compensated by a suitable length of PM fiber. The fast axis of the PM fiber should be oriented such that it is parallel to the slow axis of the coil. Whether it is possible to accomplish this in practice is uncertain but not impossible. If the PM fiber properties are known (such as beat length, for example), it will be fairly straightforward to predict the PM fiber length needed.

4.8 Practical Implementation of Out-of-Plane Coiling

Figure 20:
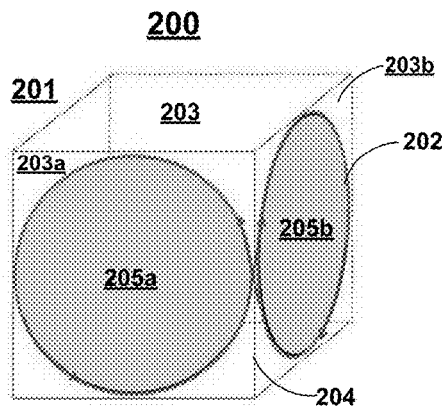
FIG. 20 shows a schematic diagram of an exemplary geometry for implementing an out-of-plane coiling configuration according to an aspect of the invention.

FIG. 20 shows a schematic diagram of an exemplary practical geometry 200 for implementing the described out-of-plane coiling configuration. A chassis 201 provides the structural foundation for the winding of an optical fiber 202. According to an aspect of the invention, the chassis 201 has a generally polyhedral shape. For example, as shown in FIG. 20, the chassis 201 can have a cube, or cube-like shape.

Chassis 201 comprises a plurality of faces 203 lying in respective planar directions. Neighboring faces meet at respective edges 204. At least one pair of neighboring faces 203a and 203b defines a pair of substantially orthogonal planar directions. In the present example, because the chassis 201 is cube-shaped, each pair of neighboring faces will by definition lie in planes having an orthogonal relationship.

An out-of-plane coiling scheme can be realized by providing at least one pair of winding hubs 205a and 205b, or other suitable winding structures, located respectively at the at least one pair of neighboring faces 202a and 202b. As further shown in FIG. 20, according to a further aspect of the invention, the fiber is wound in one direction (i.e., clockwise or counterclockwise) onto the first hub 205a and in the opposite direction onto the second hub 205b. In making the transition between the first and second hubs, the fiber diagonally traverses a chassis edge 204 between the two hubs.

According to a further aspect of the invention, the edges and vertices of the chassis are rounded to prevent damage to the wound fiber. The chassis and hubs may be manufactured in a number of different ways. In one practice, the chassis and hubs are machined, molded, or otherwise fabricated from a single piece of metal, plastic, or other suitable material.

Further, as discussed above, in a further practice of the invention, a "coil" may comprise a plurality of loops wound onto more than one plane lying in the same planar direction. Thus, in the FIG. 20 geometry 200, it would be possible to form a suitable coil by winding a plurality of fiber loops onto winding hub 205a (or 205a), and a winding hub located on the opposite side of the cube-shaped chassis.

Figure 21:
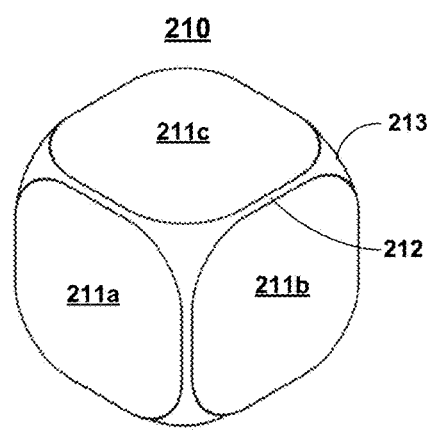
FIGS. 21 and 22 show isometric views of an out-of-plane winding block according to an aspect of the invention.
Figure 22:
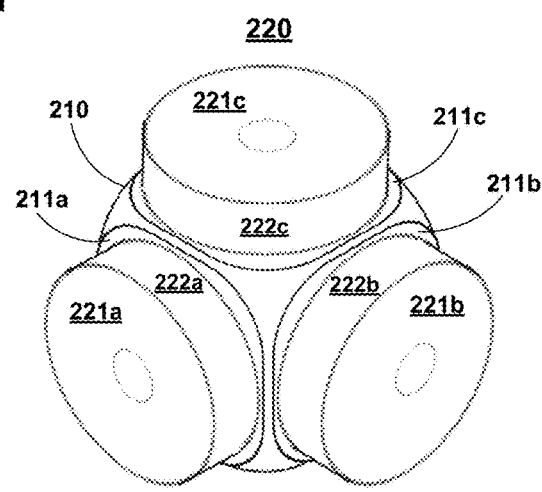

FIGS. 21 and 22 show isometric views of a further practical implementation of the described out-of-plane coiling configuration. FIG. 21 shows an isometric view of a substantially cube-shaped chassis 210, having a total of six substantially square faces, of which three faces 211a, 211b, and 211c are visible. Chassis 210 further includes rounded edges 212 and vertices 213. As mentioned above, the purpose of the rounding is to prevent damage or stress to a fiber wound onto the chassis.

Each of faces 211a, 211b, and 211c, together a respective opposite face, lies substantially in a respective planar direction. Each of the three planar directions is substantially orthogonal to the other two.

FIG. 22 shows an isometric view of an example of a finished winding block 220 employing chassis 210. Each of chassis faces 211a, 211b, and 211c are provided with a respective outwardly extending hub 221a, 221b, 221c. In the depicted example, hubs 221a, 221b, and 221c each have a substantially cylindrical shape, with a circular, smooth outer winding surface 222a, 222b, and 222c.

The winding block 220 may be constructed in a number of different ways, and from different materials. For example, the winding block may be fabricated from a suitable plastic, metal, or combination thereof, that is machined or molded to form the described structures.

The winding structure 220 can be fabricated with each face having a respective hub, i.e., with six hubs. However, the winding structure 220 may be fabricated with fewer than six hubs, leaving a number of free faces that would be available for other purposes, such as providing a resting surface, or for providing structural interaction with other elements in an optical transmission system.

It should further be noted that only two winding hubs are required to practice aspects of the invention. Thus, if desired, winding block 220 could be fabricated with only two winding hubs. However, it may be desirable to include one or more "extra" hubs. These extra hubs may be used in different ways, depending upon a given application. For example, it may be desired to use the same winding device for two or three different fibers. In addition, it may be desired to wind a single fiber onto more than two hubs.

It should also be noted that it would be possible to create an out-of-plane winding configuration without using a separate winding block. For example, suitable orthogonal winding hubs could be provided as part of another component in an optical system, or even as part of a device's housing.

4.9 Experimental Conformation of DGD for Different Coiling Configurations

It has been confirmed experimentally that an out-of-plane coiling scheme of the type described herein can indeed result in very low DGD.

Figure 23:
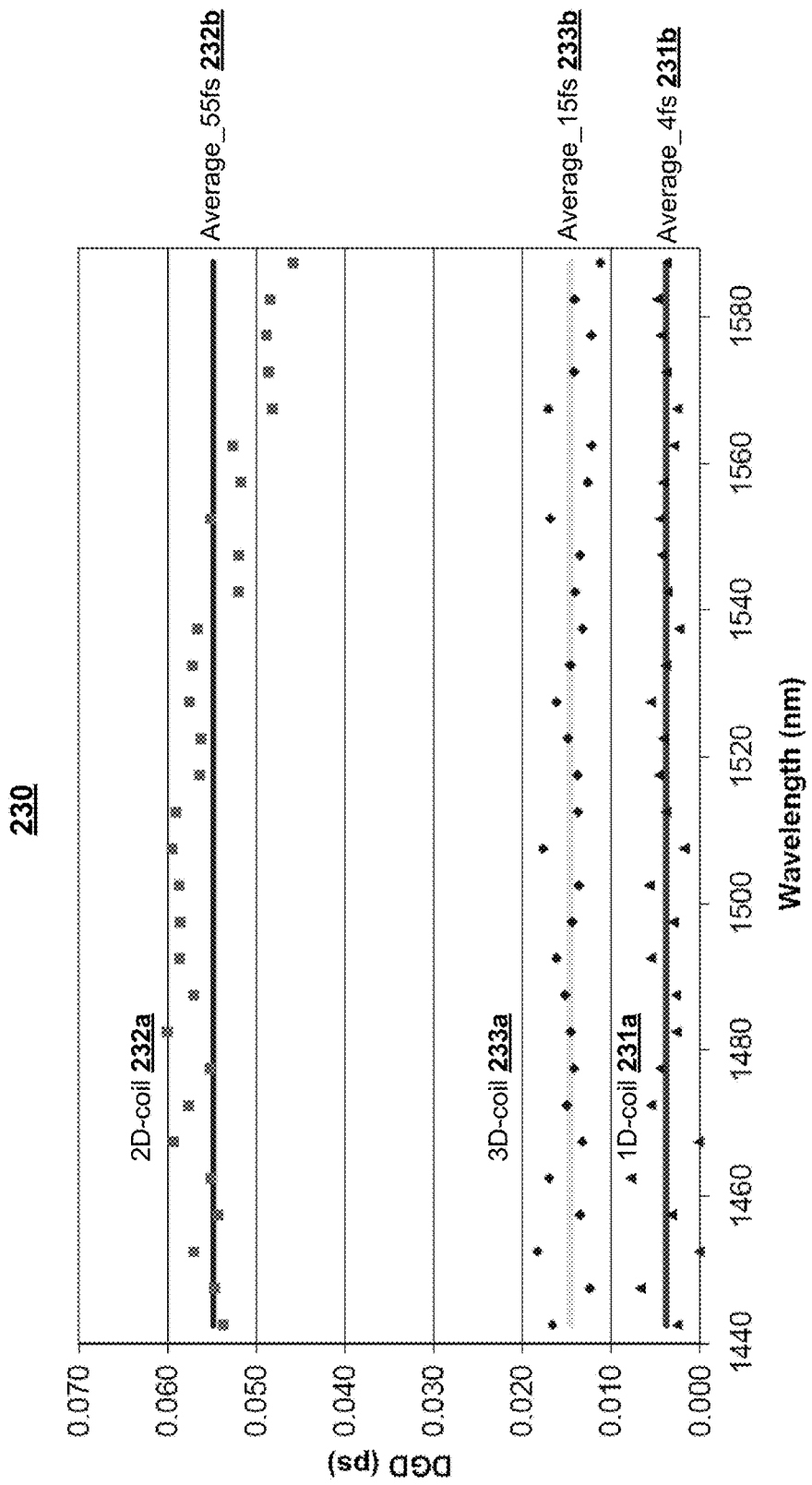
FIG. 23 is a graph showing DGD as function of wavelength for three different coiling configurations.

FIG. 23 shows a graph setting forth measured DGD for three coiling configurations of a bend-insensitive fiber with total length of 1.6 m:

Configuration 1: a "one-dimensional" coil configuration, comprising a single coil having a diameter that was sufficiently large that the DGD was expected to approach that of a straight fiber (i.e., zero).

Configuration 2: a "two-dimensional" coil configuration, comprising a 1.25 m length of fiber wound into a coil having a diameter of 10 mm.

Configuration 3: a "three-dimensional" coil configuration, according to the geometry illustrated in FIG. 20, discussed above, comprising a 1.25 m length of fiber wound into first and second coils lying substantially in first and second substantially orthogonal planar directions.

FIG. 230 is a graph showing the results of the experiment. Data points 231a, 232a, and 233a show, respectively, the measured DGD for Configurations 1, 2, and 3 in 30 trials conducted at different wavelengths. Lines 231b, 232b, and 233b show the respective average DGD across the range of testing wavelengths.

As shown by data points 231a and line 231b, the DGD for the one-dimensional configuration was measured to be less than 4 fs.

As shown by data points 232a and line 232b, the DGD for the two-dimensional configuration was measured to be approximately 55 fs.

As shown by data points 233a and line 233b, the DGD for the three-dimensional out-of-plane configuration was measured to be approximately 15 fs.

Thus, compared with the two-dimensional configuration, the three-dimensional out-of-plane configuration resulted in a reduction of DGD by almost a factor of 4.

It is noted that with respect to the two-dimensional coil configuration, the expected DGD for a 1.25 m length of fiber wound into a coil with a diameter D of 10 mm can be calculated as follows:

$$BGD_{bend} = \frac{0.137}{c}\left(\frac{d}{D}\right)^2 \qquad (4.08)$$

where d is the fiber diameter (in this case 125 μm). Thus, in the present example, for a 1.25 m length of fiber, the expected DGD is approximately 89 fs. The actual measured DGD was 55 fs, i.e., a little less than expected.

5. General Technique

Figure 24:
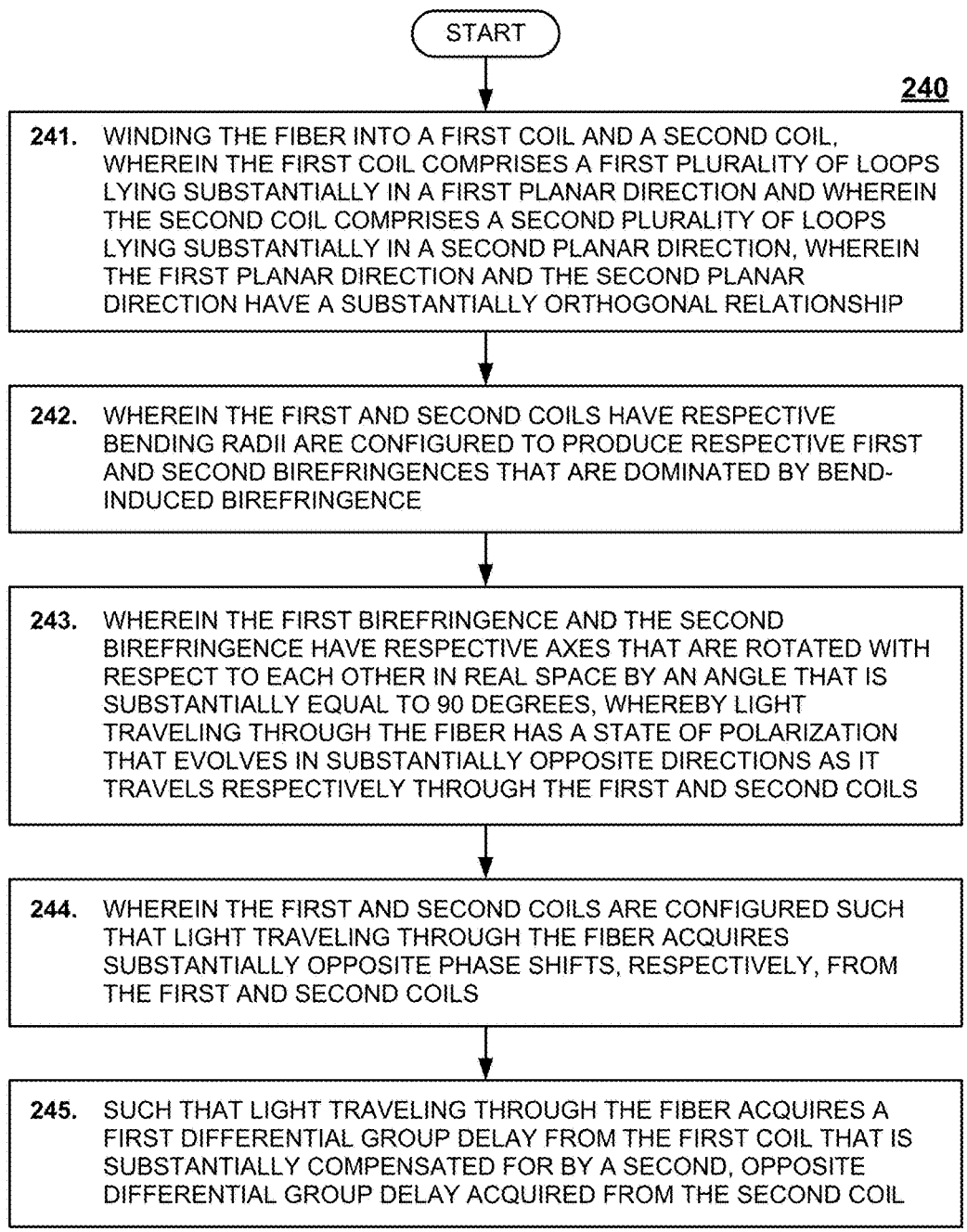
FIG. 24 shows a flowchart of a general technique according to a practice of the invention.

FIG. 24 shows a flowchart of a general technique 240 according to an aspect of the invention for low-DGD winding of an optical fiber.

Technique 240 includes the following elements:

241: Winding the fiber into a first coil and a second coil, wherein the first coil comprises a first plurality of loops lying substantially in a first planar direction and wherein the second coil comprises a second plurality of loops lying substantially in a second planar direction, wherein the first planar direction and the second planar direction have a substantially orthogonal relationship.

242: Wherein the first and second coils have respective bending radii are configured to produce respective first and second birefringences that are dominated by bend-induced birefringence.

243: Wherein the first birefringence and the second birefringence have respective axes that are rotated with respect to each other in real space by an angle that is substantially equal to 90 degrees, whereby light traveling through the fiber has a state of polarization that evolves in substantially opposite directions as it travels respectively through the first and second coils.

244: Wherein the first and second coils are configured such that light traveling through the fiber acquires substantially opposite phase shifts, respectively, from the first and second coils.

245: Such that light traveling through the fiber acquires a first differential group delay from the first coil that is substantially compensated for by a second, opposite differential group delay acquired from the second coil.

CONCLUSION

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method for winding an optical fiber, comprising:
   winding the fiber into a first coil and a second coil, wherein the first coil comprises a first plurality of loops lying in a first planar direction and wherein the second coil comprises a second plurality of loops lying in a second planar direction, wherein the first planar direction and the second planar direction have a orthogonal relationship,
   wherein the first and second coils have respective bending radii are configured to produce respective bend-induced first and second birefringences,
   wherein the first birefringence and the second birefringence have respective axes that are rotated with respect to each other in real space by an angle that is equal to 90 degrees, whereby light traveling through the fiber has a state of polarization that evolves in opposite directions as it travels respectively through the first and second coils, and
   wherein the first and second coils are configured such that light traveling through the fiber acquires opposite phase shifts, respectively, from the first and second coils,
   such that light traveling through the fiber acquires a first differential group delay from the first coil that is compensated for by a second, opposite differential group delay acquired from the second coil.

2. The method of claim 1, wherein the first and second coils are wound in a same circular direction.

3. The method of claim 1, wherein one of the first and second coils is wound in a clockwise direction and the other is wound in a counterclockwise direction.

4. The method of claim 1, wherein the first coil is identical to the second coil with respect to winding radius and number of loops.

5. The method of claim 1,
   wherein the winding of the fiber into the first coil includes introducing a first twist into the fiber, resulting in a first twist-induced birefringence and differential group delay in light traveling through the first coil, and
   wherein the winding of the fiber into the second coil includes introducing a second twist into the fiber, resulting in a second twist-induced birefringence and differential group delay in light traveling through the second coil,
   wherein the first twist and the second twist have opposite twisting directions and are configured such that the first and second twist-induced differential group delays compensate for each other.

6. The method of claim 1, wherein at least one of the first and second coils comprises a plurality of loops lying in a plurality of planes having the same planar direction.

7. The method of claim 1, wherein the step of winding the fiber into the first and second coils includes:
   providing a winding block having a first face lying in the first planar direction and a second face lying in the second planar direction; and
   winding the first coil onto the first face and winding the second coil onto the second face.

8. The method of claim 7,
   wherein the winding block has a plurality of faces lying in the same planar direction, and
   wherein at least one of the first and second coils comprises a plurality of loops wound onto the plurality of faces lying in the same planar direction.

9. The method of claim 7,
   wherein the winding block includes a plurality of winding hubs extending outwardly from respective faces, and
   wherein the first and second coils are wound around respective winding hubs.

* * * * *